United States Patent [19]

Geuns

[11] Patent Number: 5,050,060

[45] Date of Patent: Sep. 17, 1991

[54] INTRINSICALLY SAFE POWER SUPPLY UNIT

[75] Inventor: Guy Geuns, Wuppertal, Fed. Rep. of Germany

[73] Assignee: Hermann Hemscheidt Maschinenfabrik GmbH & Co., Wuppertal, Fed. Rep. of Germany

[21] Appl. No.: 487,380

[22] Filed: Mar. 2, 1990

[30] Foreign Application Priority Data

Mar. 2, 1989 [DE] Fed. Rep. of Germany ....... 3906621

[51] Int. Cl.$^5$ .............................................. H02M 7/06
[52] U.S. Cl. ...................................... 363/126; 363/52; 363/125; 361/18; 361/91; 361/111
[58] Field of Search ...................... 363/50, 52, 53, 54, 363/125, 126, 81, 84; 323/229, 231, 304; 361/18, 90, 91, 92, 111

[56] References Cited

U.S. PATENT DOCUMENTS 3,978,388  8/1976  de Vries .
4,321,524  3/1982  Petrovic ......................... 361/91 X

FOREIGN PATENT DOCUMENTS 2263541  7/1974  Fed. Rep. of Germany .

Primary Examiner—Steven L. Stephan
Assistant Examiner—Emanuel Todd Voeltz
Attorney, Agent, or Firm—Berman, Aisenberg & Platt

[57] ABSTRACT

An intrinsically safe power supply unit, more particularly for face supports in mining, comprising an ac transformer connected to a rectifier and power resistors for limiting the current and connected to the dc voltage output, wherein the ac voltage transformer is a resonance transformer which stabilizes the secondary voltage, and the dc voltage occurring behind the power resistors is kept constant by three voltage limiters connected in parallel.

3 Claims, 1 Drawing Sheet

INTRINSICALLY SAFE POWER SUPPLY UNIT

The invention relates to an intrinsically safe power supply unit, more particularly for face supports in mining, comprising a transformer, a rectifier connected thereto, resistance wiring for limiting the current and connected to the dc voltage output of the rectifier, and a voltage-limiting circuit comprising voltage limiters connected in parallel and containing Zener diodes which keep the output voltage constant.

A power supply unit of this kind is known from DE-Z-"ETZ-B", volume 25, 1973, part 3, pages 50 to 54, but the citation does not describe special use for face supports in mining.

The transformer in the known power supply unit is an isolating transformer to VDE 0550/0551 and 0170/0171, and the resistance wiring comprises only one resistor disposed in the positive line. The voltage limiting circuit comprises two voltage limiters in parallel, each containing a Zener diode connected between the positive line and the negative line. As a result of this construction, this intrinsically safe power supply unit is suitable only for every small loads, i.e. for electrical measuring and automatic control techniques.

However, intrinsically safe power supply units are required in explosion-proof regions in mining and need to be connected to a number of loads and must therefore ensure a high output power in the intrinsically safe region. This cannot be done by the aforementioned circuit, since the current and voltage limiters would be destroyed by the large amount of dissipated heat. In addition, owing to voltage fluctuations which originate from the mains and propagate across the transistor on the secondary side, it is always necessary to maintain a wide "interval" from the intrinsic safety limit (current/voltage ratio) to ensure that the maximum rise occurring within the range of variation of the voltage does not overstep the limit and reach the region which is not intrinsically safe. Consequently, the available power range is too small, particularly for the aforementioned application in mining.

The known circuit is also unsuitable for use in mining because mining installations must always be kept at a "floating potential", i.e. none of the live conductors must be connected to earth. A separate conductor is always carried for earthing purposes. If a short circuit between one of the live conductors and the earth conductors occurs when using the known power supply unit, e.g. if a cable is mechanically damaged; the "floating" state will be impermissibly brought to an end, since the live conductor in question will be at earth potential.

The object of the invention therefore is to improve the known power supply unit so that it is suitable in particular for mining and is highly reliable and provides a wide range of power with intrinsic safety.

To this end, according to the invention, the transformer is a resonance transformer stabilising the secondary voltage and having a resonant circuit on the secondary side, the resistance wiring comprises power resistors disposed symmetrically in a positive line and a negative line, and the voltage limiting circuit comprises three parallel voltage limiters, each voltage limiter comprising a transistor whose collector-emitter portion is disposed between the positive line and the negative line and whose base is actuated via a voltage divider comprising a Zener diode and a high-value resistor and disposed between the positive line and the negative line.

The use of a resonance transformer according to the invention results in a reduction in voltage fluctuations on the secondary side, so that the current and voltage limiters can advantageously be designed for a small voltage or current range. This is also a method of bringing the power, i.e. the voltage multiplied by the current, nearer the intrinsic-safety limited without the possibility of exceeding it, since the secondary voltage is already practically constant. The resistance wiring according to the the invention has a symmetrical construction, and consequently if a short circuit occurs between the positive or negative line and the earth conductor, the circuit is still kept in a "floating" state, since at least half of the resistance wiring, i.e. the power resistor of either the positive or the negative line, is still in the path of the short-circuit current, so that there is still a potential difference between the live conductor and the earth conductor. Finally, the special design of the voltage-limiting circuit also increases the available power and thus contributes to increased safety, since the Zener diodes are used exclusively for control purposes and the actual voltage limitation is via the transistors, which can advantageously be adapted for increased power or dissipated heat at much less expense than the Zener diodes. The triple parallel circuit also increases the safety, since even if two voltage limiters fail, operation in the intrinsically safe region is still ensured.

Admittedly, a resonance transformer used as a voltage regulator is known per se from De-Z-"ntz", volume 34, part 1, pages 25 to 28. However, use thereof is not known or obvious in conjunction with an intrinsically safe power supply unit of the kind according to the preamble, since resonance transformer is used either without additional stabilization or with a downstream semiconductor circuit or with a downstream switching transformer. Undoubtedly, intrinsic safety cannot be ensured without additional stabilisation, and the remaining circuits are not suitable as intrinsically safe circuits, owing to the semiconductor components placed in the path of the current.

The special design of the voltage limiters is known per se from DE-OS 22 63 541, but a combinantion of this feature with the other features in claim 1 is not immediately obvious, particularly in the triple parallel circuit of voltage limiters according to the invention. This feature, precisely in combination with the other features, contributes in particularly advantageous manner to solving the aforemetioned problem, i.e. of ensuring the high reliability in operation which is particularly necessary in mining.

Advantageously also, according to the invention, the output dc of the rectifier on the secondary side is 24 v and the dc voltage limiters is 12 V. The invention therefore on the one hand limits the maximum current to 4 A by limiting the current by the power resistors, and on the other hand limits the output voltage by the voltage limiters, without external loading, to 12 V, thus providing the conditions for intrinsic safety. Fluctuations of about ±25° in the input voltage are compensated by the reasonance transformer.

In a preferred embodiment of the invention the transistor in each voltage limiter is an npn transistor, its collector being connected to the positive line and its emitter being connected to the negative line.

The invention will be explained in detail with reference to the accompanying drawings, in which.

Figure 1:
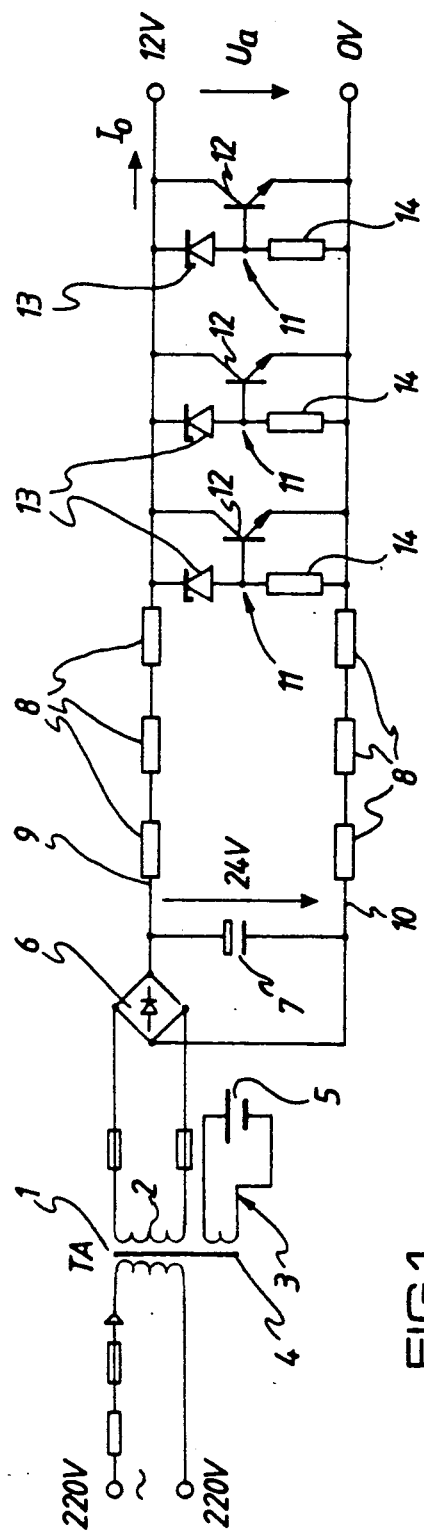
FIG. 1 is a block circuit diagram of the unit according to the invention.
Figure 2:
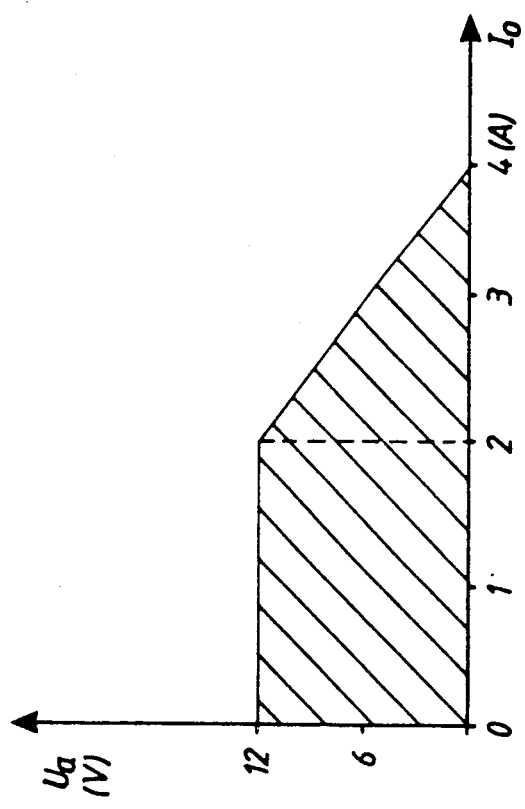
FIG. 2 is a voltage-current graph for the intrinsically safe output.

A power supply unit according to the invention comprises a resonance transformer 1. The ac voltage at the resonance transformer input is e.g. 220 V. The transmission ratio of the reasonance transformer 1 is such that the output ac voltage at its secondary side is about 24 V. On the secondary side, in addition to the secondary winding 2, the resonance transformer 1 has a resonant circuit 3 comprising a coil 4 and a capacitor 5. The resonant circuit 3 stabilises the voltage on the secondary side so that the output voltage on the secondary side is hightly stable. The secondary-side output voltage of the secondary winding 2 is rectified in a rectifier 6. A capacitor 7 is connected between the positive and negative terminal at the rectifier output, thus smoothing the dc voltage at the rectifier output. The output dc voltage in the example shown is 24 V dc. In order to limit the current, at least one power resistor 8 is disposed in the positive or negative line 9, 10 in the output line. In the embodiment shown, six power resistors 8 are provided, three resistors 8 in series in the positive line 9 and three resistors 8 in series in the negative line 10. The result is a symmetrical distribution of the power resistors 8. The power resistor or resistors are dimensioned so that the maximum current $I_{max}$ on the secondary side is limited to 4 A. This advantageously results in a total resistance of 6Ω for the power resistors 8, so that each individual resistor 8 has a value of 1Ω. On the output side, the power supply unit according to the inventin is terminated by three voltage limiters 11 connected in parallel. The voltage limiters 11 limit the output voltage $U_a$ to 12 V and ensure that the output voltage is kept constant for output currents up to 2 A. Preferably each voltage limiter comprises an npn transistor 12 whose collector is connected to the positive line 9 and whose emitter is connected to the negative line 10. The base of the transistor is actuated via a Zener diode 13 and a high-value resistor 14. The triple parallel circuit ensures that, even if two faults occur simultaneously, operation is always reliable.

Another feature of the power supply unit according to the invention is that no semiconductors are present inside the current-regulating and current-limiting system, since these functions are performed by the resonance transformer 1 and the power resistors 8. The power supply unit according to the invention is therefore characterised in that:

1. the output voltage is kept constant at 12 V over a wide range of power and the current does not exceed a maximum of 2 A, so that the conditions for intrinsic safety are fulfilled, 2. if two faults occur the system is still reliable, and no semiconductors are present in the curren-regulating means, and 3. voltage fluctuations of ±25% are compensated without altering the initial characteristics.

I claim:

1. An intrinsically safe power supply unit, more particularly for face supports in mining, comprising a transformer, a rectifier connected thereto, resistance wiring for limiting the current and connected to the dc voltage output of the recitifier, and a voltage-limiting circuit comprising voltage limiters connected in parallel and containing Zener diodes which keep the output voltage constant, wherein the transformer is a resonance transformer stabilising the secondary voltage and having a resonant circuit on the secondary side, the resistance wiring comprises power resistors disposed symmetrically in a positive line and a negative line, and the voltage limiting circuit comprises three parallel voltage limiters, each voltage limiter comprising a transistor whose collector-emitter portion is disposed between the positive line and the negative line and whose base is actuated via a voltage divider comprising a Zener diode and a high-value resistor and disposed between the positive line and the negative line.

2. An intrinsically safe power supply unit according to claim 1, wherein the output dc of the rectifier on the secondary side is 24 V and the dc voltage at the voltage limiters is 12 V.

3. An intrinsically safe power supply unit according to claim 1, wherein the transistor in each voltage limiter is an npn transistor, its collector being connected to the positive line and its emitter being connected to the negative line.

* * * * *